United States Patent
Leyko et al.

(10) Patent No.: US 11,168,610 B2
(45) Date of Patent: Nov. 9, 2021

(54) CONSTANT-VOLUME COMBUSTION SYSTEM COMPRISING A ROTATING CLOSURE ELEMENT WITH SEGMENTED APERTURES

(71) Applicant: SAFRAN, Paris (FR)

(72) Inventors: Matthieu Leyko, Moissy-Cramayel (FR); Pierre Jean-Baptiste Metge, Moissy-Cramayel (FR); Eric Conete, Moissy-Cramayel (FR); Gautier Mecuson, Moissy-Cramayel (FR)

(73) Assignee: SAFRAN, Paris (FR)

( * ) Notice: Subject to any disclaimer, the term of this patent is extended or adjusted under 35 U.S.C. 154(b) by 129 days.

(21) Appl. No.: 16/624,727

(22) PCT Filed: Jun. 20, 2018

(86) PCT No.: PCT/FR2018/051494
§ 371 (c)(1),
(2) Date: Dec. 19, 2019

(87) PCT Pub. No.: WO2018/234698
PCT Pub. Date: Dec. 27, 2018

(65) Prior Publication Data
US 2021/0156302 A1 May 27, 2021

(30) Foreign Application Priority Data
Jun. 23, 2017 (FR) .................................. 1755763

(51) Int. Cl.
*F02C 5/12* (2006.01)
*F01D 5/28* (2006.01)
(Continued)

(52) U.S. Cl.
CPC ................ *F02C 5/12* (2013.01); *F01D 5/282* (2013.01); *F02C 3/08* (2013.01);
(Continued)

(58) Field of Classification Search
CPC ........ F02C 5/12; F02C 3/08; F05D 2220/323; F05D 2240/12; F05D 2300/6033; F23R 7/00
See application file for complete search history.

(56) References Cited

U.S. PATENT DOCUMENTS

| 2,370,217 A | 2/1945 | Wright |
| 3,650,105 A * | 3/1972 | Toye ........................ F02C 5/02 60/39.43 |

(Continued)

FOREIGN PATENT DOCUMENTS

| CN | 103775213 A | 5/2014 |
| DE | 20315734 U1 | 12/2003 |

(Continued)

OTHER PUBLICATIONS

International Search Report as issued in International Patent Application No. PCT/FR2018/051494, dated Oct. 22, 2018.

*Primary Examiner* — Craig Kim
(74) *Attorney, Agent, or Firm* — Pillsbury Winthrop Shaw Pittman LLP

(57) ABSTRACT

A constant-volume combustion system for a turbomachine includes a plurality of combustion chambers distributed in an annular manner about an axis defining an axial direction, each combustion chamber including an intake port and an exhaust port; a selective closure member rotationally movable about the axis with respect to the combustion chambers, the selective closure member including a ferrule facing the intake and exhaust ports of the combustion chambers, the ferrule containing at least one intake aperture intended to cooperate with the exhaust port of each chamber and at least one exhaust aperture intended to cooperate with the exhaust port of each chamber. Each intake aperture and each exhaust aperture are segmented by at least one segment extending in each aperture in the axial direction.

13 Claims, 7 Drawing Sheets

(51) Int. Cl.
*F02C 3/08* (2006.01)
*F23R 7/00* (2006.01)
(52) U.S. Cl.
CPC .... *F05D 2220/323* (2013.01); *F05D 2240/12* (2013.01); *F05D 2300/6033* (2013.01); *F23R 7/00* (2013.01)

(56) References Cited

U.S. PATENT DOCUMENTS

| | | | | |
|---|---|---|---|---|
| 4,365,472 A | * | 12/1982 | Ogata | F02C 5/12 60/39.76 |
| 5,237,811 A | | 8/1993 | Stockwell | |
| 5,960,625 A | * | 10/1999 | Zdvorak, Sr. | F02C 5/12 60/39.34 |
| 11,060,732 B2 | * | 7/2021 | Metge | F02C 5/12 |
| 2018/0038278 A1 | * | 2/2018 | Taliercio | F23R 7/00 |
| 2018/0274440 A1 | * | 9/2018 | Leyko | F02C 5/12 |

FOREIGN PATENT DOCUMENTS

| | | | | |
|---|---|---|---|---|
| FR | 3032024 A1 | * | 7/2016 | F02C 5/12 |
| FR | 3 032 781 A1 | | 8/2016 | |
| FR | 3068076 A1 | * | 12/2018 | F23R 7/00 |
| WO | WO 2013/040323 A2 | | 3/2013 | |
| WO | WO 2016/120551 A1 | | 8/2016 | |
| WO | WO 2016/120555 A1 | | 8/2016 | |
| WO | WO-2020012112 A1 | * | 1/2020 | F02C 5/12 |

\* cited by examiner

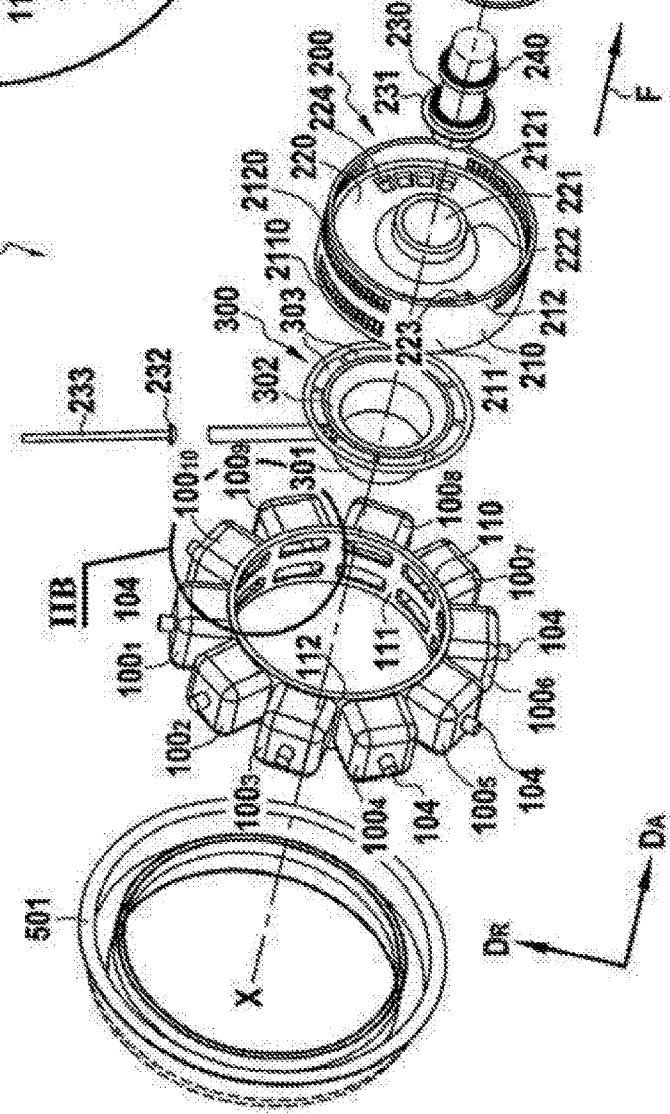
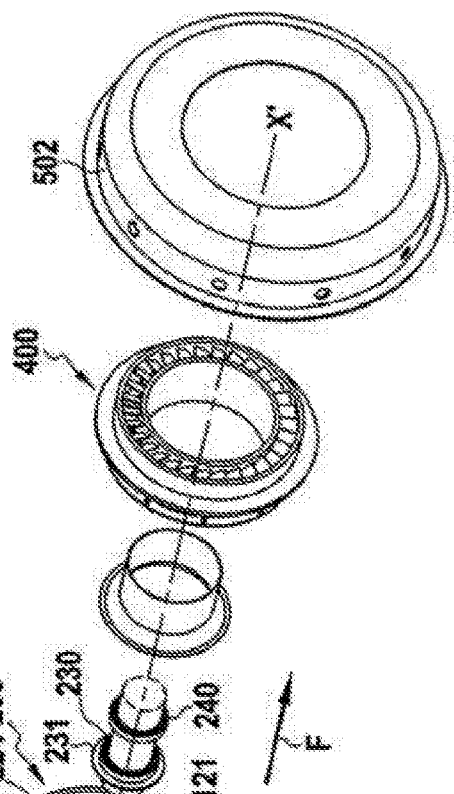
FIG.2B
FIG.2A

| Angle of rotation of the closure member | Chamber $100_1$ | Chamber $100_2$ | Chamber $100_3$ | Chamber $100_4$ | Chamber $100_5$ | Chamber $100_6$ | Chamber $100_7$ | Chamber $100_8$ | Chamber $100_9$ | Chamber $100_{10}$ |
|---|---|---|---|---|---|---|---|---|---|---|
| 0 | B/A | E | C | C | B/A | B/A | E | C | C | B/A |
| 36 | B/A | B/A | E | C | C | B/A | B/A | E | C | C |
| 72 | C | B/A | B/A | E | C | C | B/A | B/A | E | C |
| 108 | C | C | B/A | B/A | E | C | C | B/A | B/A | E |
| 144 | E | C | C | B/A | B/A | E | C | C | B/A | B/A |
| 180 | B/A | E | C | C | B/A | B/A | E | C | C | B/A |
| 216 | B/A | B/A | E | C | C | B/A | B/A | E | C | C |
| 252 | C | B/A | B/A | E | C | C | B/A | B/A | E | C |
| 288 | C | C | B/A | B/A | E | C | C | B/A | B/A | E |
| 324 | E | C | C | B/A | B | E | C | C | B/A | B/A |

B/A : scavenging/intake phase
C : combustion phase
E : exhaust phase

FIG.12

CONSTANT-VOLUME COMBUSTION SYSTEM COMPRISING A ROTATING CLOSURE ELEMENT WITH SEGMENTED APERTURES

CROSS-REFERENCE TO RELATED APPLICATIONS

This application is the U.S. National Stage of PCT/FR2018/051494, filed Jun. 20, 2018, which in turn claims priority to French patent application number 1755763 filed Jun. 23, 2017. The content of these applications are incorporated herein by reference in their entireties.

BACKGROUND OF THE INVENTION

The present invention relates to the field of aircraft turbomachine combustion chambers, of constant-volume combustion type. The invention is applicable to any type of turbomachine, in particular to jet engines, turbo-propeller engines, and turbomachines with unducted fans, also known as "Open Rotor".

A conventional aircraft turbomachine contains in a known manner one or more combustion chambers. Such a combustion chamber is supplied with pressurized air by a compressor module and it contains a fuel injector which is capable of injecting fuel into the air flow taken in to burn it and thus cause the emission of hot gases which are used to drive a turbine, which in turn drives the compressor module and which can also drive a fan of the turbomachine.

In such a chamber, the fuel flow rate is continuous and the combustion operates according to a so-called Brayton cycle, i.e. according to a constant-pressure combustion or "CPC" cycle. However, to obtain specific consumption gains, it has been envisaged to replace the combustion chamber operating according to a Brayton cycle by a plurality of combustion chambers operating according to a Humphrey cycle, i.e. according to a constant-volume combustion or "CVC" cycle.

The document WO 2016/120551 discloses a constant-volume combustion module containing combustion chambers arranged about an axis, each chamber comprising a compressed gas intake port and a burnt gas exhaust port, and a rotary intake/exhaust valve. Each intake/exhaust port is configured to be opened or closed by the rotary intake/exhaust valve.

To use this type of constant-volume combustion module in a gas turbine of high power, it is desirable to possess a considerable number of combustion chambers (for example at least three). In certain cases, several chambers must be synchronized in operation, i.e. be in the same state at the same instant. In such a situation, the rotary valve can take the form of a cylinder provided with apertures extending circumferentially over a predetermined length, the apertures being able to cooperate with the intake and exhaust ports of each chamber. Such a rotary valve thus has apertures that can have a considerable size as a function of the number of combustion chambers to be synchronized and/or of the size of said chambers. Such a valve can moreover comprise several of these apertures over a same annular section of the valve. These apertures thus greatly reduce the stiffness of the valve, and therefore its mechanical resistance and its reliability when it is rotationally driven in the gas turbine.

PURPOSE AND SUMMARY OF THE INVENTION

The aim of the present invention is thus to make it possible to dispense with the aforementioned drawbacks by proposing a constant-volume combustion system for a turbomachine comprising:

a plurality of combustion chambers distributed in an annular manner about an axis defining an axial direction, each combustion chamber comprising an intake port and an exhaust port, a selective closure member rotationally movable about the axis with respect to the combustion chambers, the selective closure member comprising a ferrule facing the intake and exhaust ports of the combustion chambers, the ferrule containing on a first annular section at least one intake aperture intended to cooperate with the intake port of each combustion chamber during the rotation of the selective closure member and on a second annular section at least one exhaust aperture intended to cooperate with the exhaust port of each combustion chamber during the rotation of the selective closure member, each intake aperture and each exhaust aperture extending over a determined length in a circumferential direction with respect to the axis.

In accordance with the invention, each intake aperture and each exhaust aperture are segmented by at least one segment extending in each aperture in the axial direction. Thus, owing to the presence of segments in each of the apertures, the latter are reinforced and the stiffness of the selective closure member is thereby improved.

In an exemplary embodiment, each segment extends only in the thickness of the wall of the ferrule of the selective closure member. In other words, the segments do not project past the wall of the ferrule. Or again, each segment has a length measured in the radial direction (with respect to the axial direction) which is less than or equal to the thickness of the wall of the ferrule of the selective closure member (also measured in the radial direction). This feature allows for the better incorporation of the constant-volume combustion chamber for a turbomachine.

In an exemplary embodiment, the intake and exhaust apertures can be simultaneously present on at least one circumferential section of the ferrule (i.e. side-by-side on a section of the ferrule). The circumferential section of the ferrule (i.e. a certain angular section of the ferrule) over which the intake and exhaust apertures are simultaneously present corresponds to a scavenging phase (wherein air coming from a compressor crosses a combustion chamber to empty it and fill it again) upon the passing of said circumferential section opposite a combustion chamber, as will be explained later.

In an exemplary embodiment, each segment of each exhaust aperture can have, in a plane perpendicular to the axis, an aerodynamic profile extending between a leading edge and a trailing edge, the leading edge being radially directed outward with respect to the trailing edge. Owing to such a disposition, it is possible to reduce the aerodynamic losses due to the presence of the segments in each exhaust aperture. In particular, in the case of an exhaust aperture, the aerodynamic profile is oriented as a function of the direction of the gas flow crossing the aperture, i.e. radially from the outside to the inside of the selective closure member. To reduce the effect on the gas flows of a single segment, at least one segment of the exhaust aperture can have an aerodynamic profile as defined above.

When the selective closure member is rotationally driven, the different segments of an exhaust aperture thereof do not "see" the same type of gas flow. Specifically, the segments that will be on one side of the exhaust aperture will always see a gas flow corresponding to an exhaust phase of a combustion chamber, whereas segments located on the other side of the exhaust aperture will always see a gas flow corresponding to a phase of end-of-exhaust or scavenging of a combustion chamber. Thus, the incidence of the gas flow on the aerodynamic profiles of the segments varies from one edge to the other of the exhaust aperture, and in particular from a high incidence (high pressure and temperature) to a lower incidence (low pressure and temperature).

In order to take into account this variation of the incidence of the gas flow as a function of the circumferential position of each segment in the aperture, it can be advantageous that each exhaust aperture be uniformly segmented by a plurality of different segments each having an angle of attack, the angle of attack of each segment varying in a strictly monotonic manner from one segment to the other along the exhaust aperture. The angle of attack can be defined as the angle that the normal makes with the surface of the segment taken at its leading edge with the normal to the external face of the ferrule of the selective closure member taken at the leading edge of the segment under consideration.

As a variant, each exhaust aperture can be uniformly segmented by a plurality of different groups of segments, wherein each segment of one and the same group has an identical angle of attack, the angle of attack of the segments of one and the same group of segments varying in a strictly monotonic manner from one group of segments to the other along the exhaust aperture. This design is easier to implement than the previous one, particularly since it reduces the number of different types of segments for which provision must be made.

The previous advantageous dispositions can be applied in a similar way to each intake aperture, although the variations of incidence in the gas flow are less than in the case of the exhaust.

In an exemplary embodiment, each segment of the intake aperture has, in a plane perpendicular to the axis, an aerodynamic profile extending between a leading edge and a trailing edge, the leading edge being radially directed inward with respect to the trailing edge. Owing to such a disposition, it is possible to reduce the aerodynamic losses due to the presence of the segments in each intake aperture. In particular, in the case of an intake aperture, the aerodynamic profile is oriented as a function of the direction of the gas flow crossing the aperture, i.e. radially from the inside toward the outside of the selective closure member. To reduce the effect on the gas flow of a single segment, at least one segment of the intake aperture can have an aerodynamic profile as defined above.

In an exemplary embodiment, the combustion system can further comprise a fixed intake guide present on the inside of the ferrule of the selective closure member on the side of the first section of said closure member, the intake guide containing a central cylinder radially extended by a disc, the cylinder and the disc forming a deflector configured to guide the air arriving on the intake guide in the direction of the intake ports of the combustion chambers. Owing to the intake guide, the introduction of a flow of fresh air into each combustion chamber is optimized.

In an exemplary embodiment, the selective closure member can further comprise a wall extending from the internal face of the ferrule in a radial direction and separating the first and second annular sections of the ferrule, said wall containing at least one bypass aperture extending over an angular area located outside the angular areas over which extend said at least one intake aperture and said at least one exhaust aperture, said at least one bypass aperture being angularly segmented by at least one segment extending in a radial direction with respect to the axis. Owing to the presence of one or more bypass apertures on the selective closure member, it is possible to constantly have an air flow in the combustion module, this air flow bypassing the combustion chambers. As a consequence, with a constant air flow between the buffer volume upstream of the combustion system (output of the compressor) and the output of the combustion system (supply of the turbine), the fluctuations of flow rate and pressure are reduced in the combustion system, which makes it possible to improve the fluidity of the load on a compressor present upstream of the combustion system as well as the efficiency of a turbine placed downstream of the combustion system. Moreover, the bypass aperture or apertures being present on the member in rotation of the combustion system, the air flow is regularly distributed over different parts of the combustion system, which makes it possible to purge these parts of the burnt gases and to cool them regularly.

In this case, and when the combustion system comprises a fixed intake guide as defined above, the fixed intake guide can further comprise a plurality of apertures capable of cooperating with each bypass aperture of the wall of the selective closure member.

In an exemplary embodiment, each combustion chamber can be delimited by an enclosure, a closed rear bottom forming a single part with the enclosure and a cylindrical ring to the external face of which the enclosure is attached, the cylindrical ring forming a front bottom of each combustion chamber, the cylindrical ring containing a first series of apertures each forming an intake port of a combustion chamber and a second series of apertures each forming an exhaust port of a combustion chamber, the system further comprising a fixed exhaust manifold which extends in an annular manner inside the ferrule of the selective closure member along the second section of said ferrule, the exhaust manifold containing a plurality of partitioned compartments each present at the level of an exhaust port of a combustion chamber. Such a design facilitates the manufacturing of the combustion chambers and their annular distribution around the axis of the combustion system. Owing to this partitioned exhaust manifold, the exhaust of a combustion chamber is independent of the other combustion chambers, which makes it possible to reduce the returns of pressurized hot gases from one chamber toward another, in particular during a phase of scavenging of a combustion chamber.

In this case, each aperture of the second series of apertures can be circumferentially separated from its neighbor by a non-zero distance, the exhaust aperture comprising a plurality of segments uniformly distributed in said aperture and mutually separated by a distance less than or equal to the distance separating two apertures of the second series of apertures. With such a disposition, the possibility is further reduced of hot gases returning from one chamber toward the other, in particular during a phase of scavenging of a combustion chamber. Specifically, the segmentation of the exhaust aperture in this way makes it possible to prevent the gas from crossing from one chamber to the other by passing through the thickness of the exhaust aperture.

A combustion system according to the invention can comprise ten combustion chambers distributed in an annular manner around the axis, the ferrule of the selective closure member containing two diametrically opposed intake apertures on the first annular section and two diametrically opposed exhaust apertures on the second annular section of said ferrule, the wall of the selective closure member containing two bypass apertures extending over an angular area located outside the angular areas over which extend the two intake apertures and the two exhaust apertures.

Preferably, the selective closure member can be made from one of the following materials: metallic material, ceramic-matrix composite material and eutectic ceramic material.

Another subject of the invention is a turbomachine comprising an axial or centrifugal compressor and an axial or centripetal turbine, the turbomachine further comprising a combustion system according to the invention, the combustion system being present between the compressor and the turbine.

Yet another subject of the invention is an aircraft comprising at least one turbo-propeller engine, the turbo-propeller engine comprising a turbomachine according to the invention.

BRIEF DESCRIPTION OF THE DRAWINGS

Other features and advantages of the present invention will become apparent from the description given below, with reference to the appended drawings which illustrate an exemplary embodiment thereof, free of any limiting character. On the figures:

FIG. 2A is an exploded perspective schematic view of the combustion system of FIG. 1, FIG. 2B is an enlarged view at the level of the reference IIB of FIG. 2A, FIGS. 3A and 3B are perspective schematic views of the selective closure member of the combustion system of FIG. 1, FIGS. 4 and 5 are respectively section views along a plane perpendicular to the axis XX' of three segments of an intake aperture and three segments of an exhaust aperture, FIG. 12 is a table showing the different phases of the Humphrey cycle of each combustion chamber as a function of the angular or rotation position of the closure member of the combustion system of FIG. 1.

DETAILED DESCRIPTION OF THE INVENTION

The invention is generally applicable to a turbomachine comprising an axial or centrifugal compressor and an axial or centripetal turbine.

Figure 1:
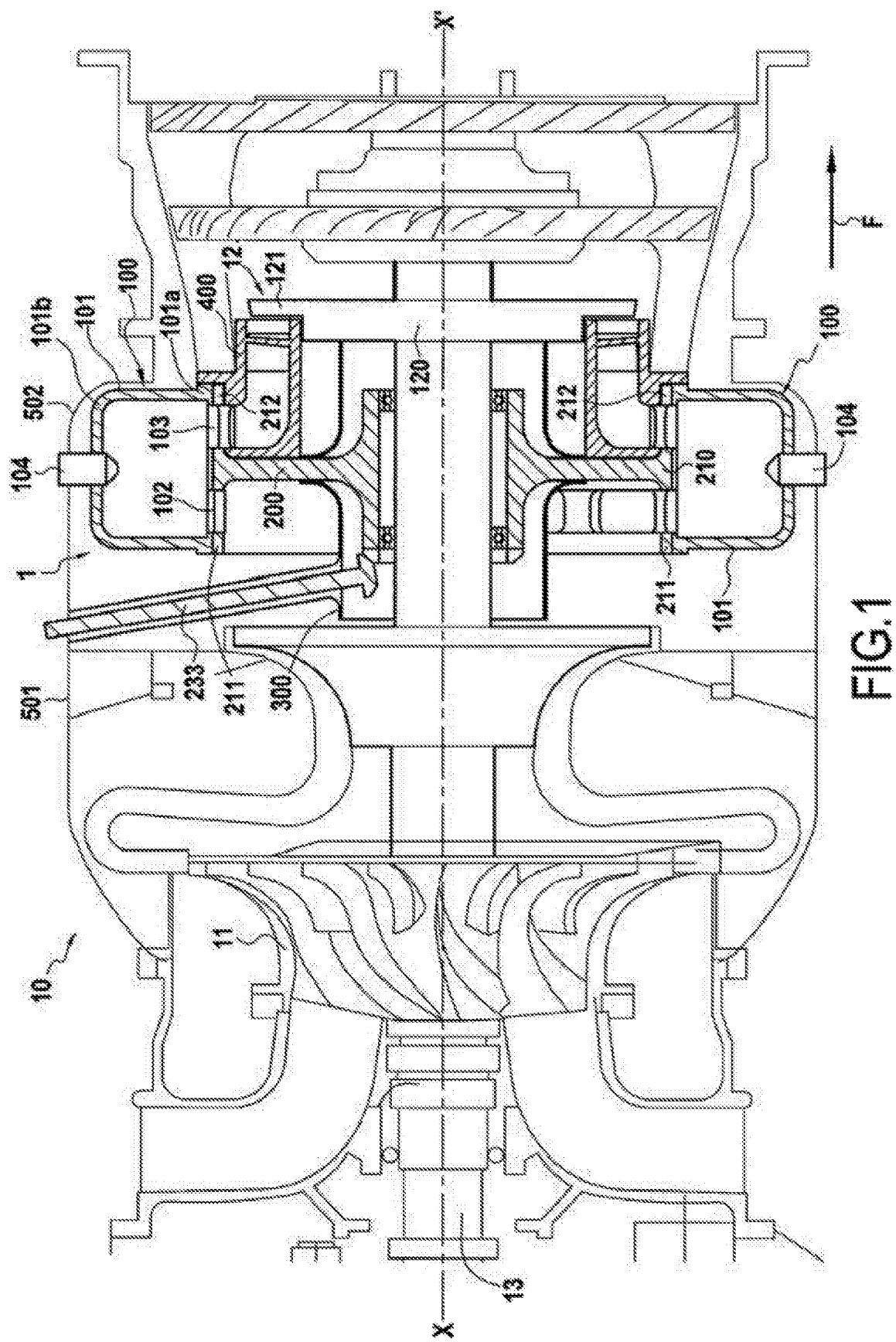
FIG. 1 is a longitudinal section schematic view of a turbomachine comprising a combustion system in accordance with an embodiment of the invention.

FIGS. 1, 2A to 2B illustrate a combustion system 1 in accordance with an embodiment of the invention. In the example described here and as represented in FIG. 1, the combustion system 1 is incorporated into a turbomachine or turboshaft 10 for a turbo-propeller engine, the combustion system being placed in the turboshaft downstream of an axial-centrifugal compressor 11 and upstream of an axial turbine 12, the compressor 11 and the turbine 12 being linked together by a system of shafts 13. The turbine 12 comprises a movable wheel 120 linked at its center to the system of shafts 13 and containing at its radial extremity a plurality of vanes 121.

The combustion system 1 comprises a plurality of combustion chambers, in the embodiment described here 10 combustion chambers 100, numbered $100_1$ to $100_{10}$ in FIG. 2A, distributed in an annular manner around an axis XX' defining an axial direction DA. Each combustion chamber 100 is delimited by an enclosure 101, here of substantially parallelepipedal shape, a closed rear bottom 101b forming a single part with the enclosure 101 and a cylindrical ring 110 to the external face 112 of which the enclosure 101 is attached, for example by welding, brazing, mechanical coupling (screw-nut) or bonding when the enclosures 101 and the cylindrical ring 110 are made of metallic material. The cylindrical ring 110 and the enclosures 101 can also be made of ceramic-matrix composite (CMC) material, i.e. a material formed of a reinforcement made of carbon fibers or ceramic densified by an at least partly ceramic matrix.

The cylindrical ring 110 forms the front bottom 101a of each combustion chamber which is located as close as possible to the axis XX' in an opposite direction to the rear bottom 101b in a radial direction DR. The cylindrical ring 110 contains a first series of apertures 113 each forming an intake port 102 of a combustion chamber 100 and a second series of apertures 114 each forming an exhaust port 103 of a combustion chamber 100 (FIG. 2B). The front bottom 101a of each combustion chamber 100 also contains an intake port 102 and an exhaust port 103. The internal face 111 of the cylindrical ring 110, which contains the intake and exhaust ports of each combustion chamber, is intended to be placed facing a ferrule of a selective closure member described hereinafter in detail. The enclosures 101 of the combustion chambers extend from the external face 112 of the ring 110 in the radial direction DR. In the example described here, each combustion chamber 100 is furthermore equipped with a fuel injector 104 here placed on the rear bottom 101b of each chamber 100. The injection can also be implemented by means of an injection wheel (not represented in FIGS. 2A and 2B). The combustion can be initiated in a known manner either by a spark igniter (ignition plug), or by a thermal gas igniter (not represented in FIGS. 2A and 2B). If the conditions allow it, the combustion can also be initiated by exhaust gas recirculation, or EGR, as in a Diesel engine.

Figure 3A:
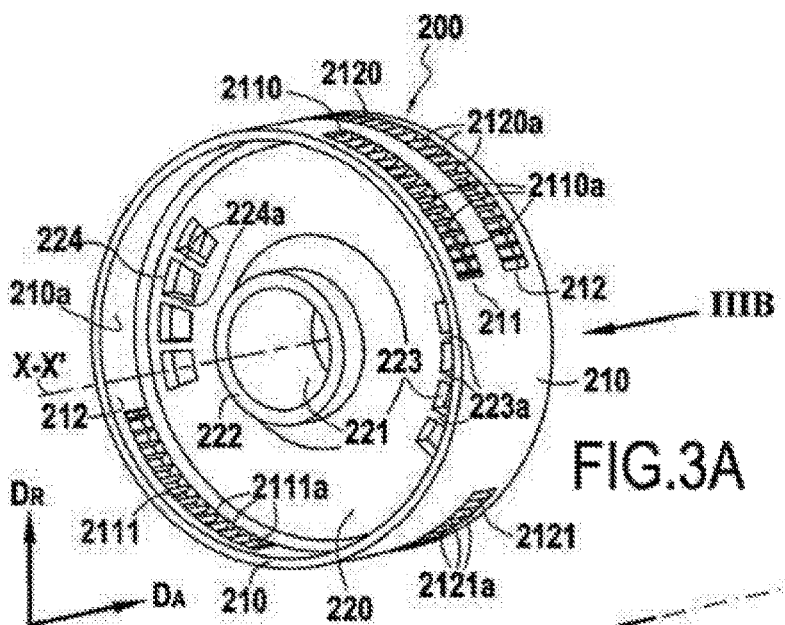
Figure 3B:
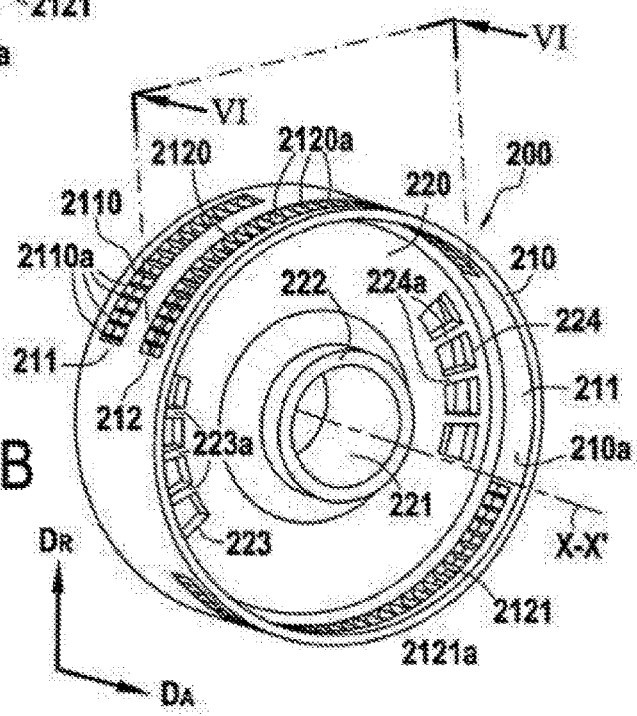

The combustion system 1 also comprises a selective closure member 200 rotationally movable about the axis XX' with respect to the combustion chambers 100. The selective closure member 200 comprises a ferrule 210 facing the intake and exhaust ports 102 and 103 of the combustion chambers 100. The ferrule 210 is divided into a first annular section 211 and a second annular section 212 each extending over the entire circumference of the ferrule 210 (FIGS. 3A and 3B). The first annular section 211 contains at least one intake aperture intended to cooperate with the intake port 102 of each combustion chamber 100 during rotation of the selective closure member 200. In the example described here, the first annular section 211 contains two intake apertures 2110 and 2111 angularly offset by 180° along the first section. The second annular section 212 contains at least one exhaust aperture intended to cooperate with the exhaust port 103 of each combustion chamber 100 upon the rotation of the selective closure member 200. In the example described here, the second annular section 212 contains two intake apertures 2120 and 2121 angularly offset by 180° along the second section. The start of each intake aperture 2110, 2111 is angularly aligned respectively with the start of each exhaust aperture 2120 and 2121, the exhaust apertures extending over a greater circumferential length than the intake apertures. The selective closure member can be made of metallic materials or made of CMC material.

In accordance with the invention, each intake aperture 2110, 2111 and each exhaust aperture 2120, 2121 is segmented by at least one segment extending in each aperture in the axial direction DA. In particular, the first and the second intake apertures 2110 and 2111 are respectively segmented by a plurality of segments 2110a and 2111a uniformly distributed circumferentially (with respect to the axis XX') in said apertures. The first and the second exhaust apertures 2120 and 2121 are respectively segmented by a plurality of segments 2120a and 2121a uniformly distributed circumferentially in said apertures. These segments make it possible to reinforce the mechanical resistance of the selective closure member 200.

According to an advantageous disposition of the invention, the segments 2110a, 2111a, 2120a and 2121a have, in a plane perpendicular to the axis XX', an aerodynamic profile extending between a leading edge and a trailing edge. This configuration makes it possible to reduce the aerodynamic disturbances induced by the presence of segments in the intake and exhaust apertures.

Figure 4:
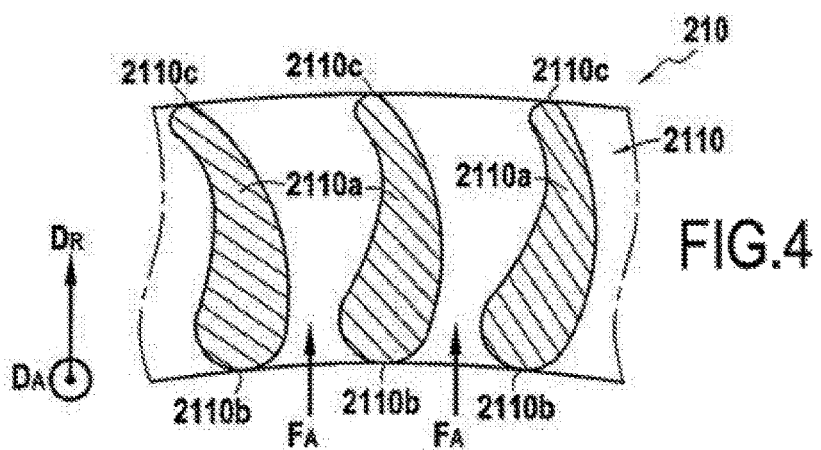

As illustrated in FIG. 4, segments 2110a of the first intake aperture 2110 have, in a plane perpendicular to the direction DA, an aerodynamic profile extending between a leading edge 2110b and a trailing edge 2110c, the leading edge 2110b being radially directed inward (i.e. directed toward the axis XX'), in such a way as to face the intake air flow FA in a combustion chamber 100 when the latter is in the scavenging phase.

Figure 5:
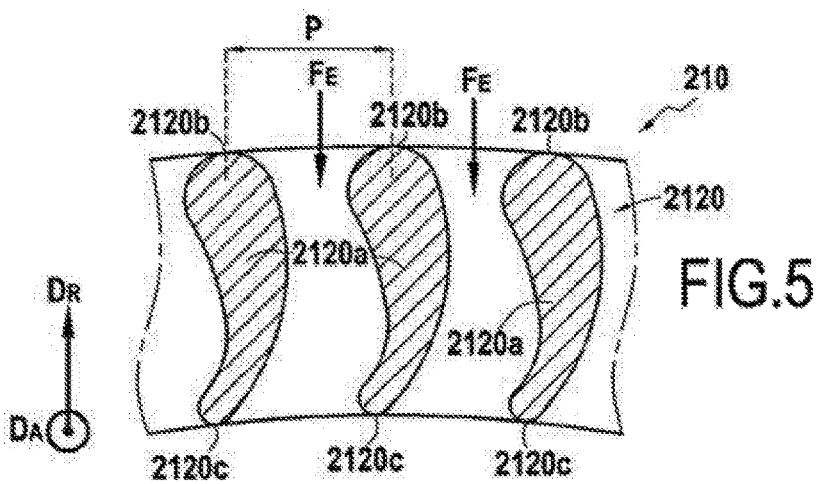

As illustrated in FIG. 5, the segments 2120a of the first exhaust aperture 2120 have, in a plane perpendicular to the direction DA, an aerodynamic profile extending between a leading edge 2120b and a trailing edge 2120c, the leading edge 2110b being radially directed outward (i.e. directed opposite to the axis XX'), in such a way as to face the exhaust air flow FE in a combustion chamber 100 when the latter is in the exhaust or scavenging phase.

Figure 6:
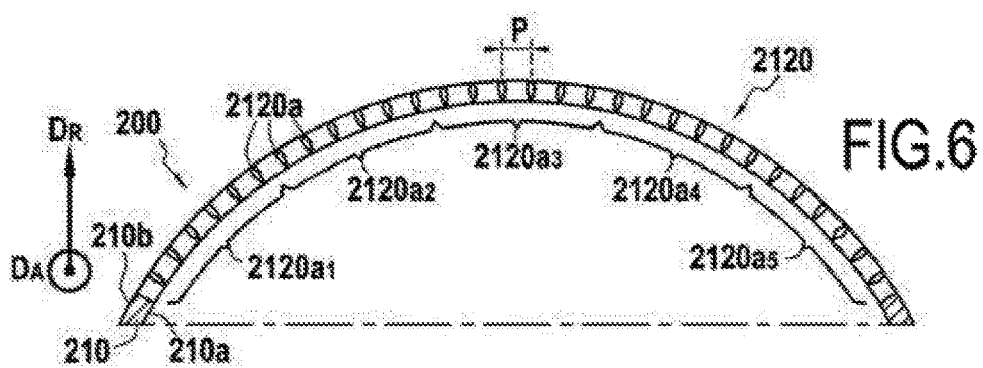
FIG. 6 is a section view along a plane perpendicular to the axis) XX' of an exhaust aperture.
Figure 7:
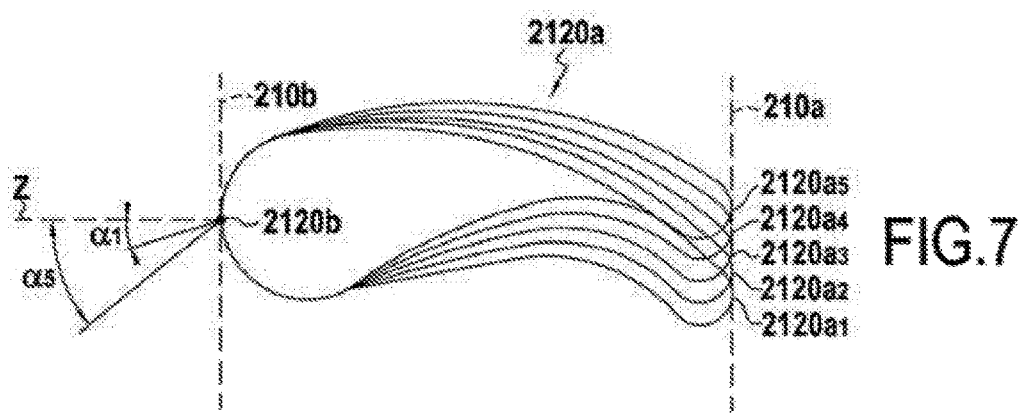
FIG. 7 illustrates the different angles of attack of groups of segments of an exhaust aperture as identified in FIG. 6, FIGS. 8A to 8D are perspective views of the exhaust manifold of the combustion system of FIG. 1.

According to an advantageous disposition of the invention illustrated in FIGS. 6 and 7, each exhaust aperture 2120 is uniformly segmented by a plurality of different groups of segments $2120ai$, $20120a2$, $20120a_3$, $2120a4$, $2120a_5$, wherein each segment 2120a of a group of segments has an identical angle of attack, the angle of attack of the segments of one and the same group of segments varying in a strictly monotonic manner from one group of segments to the other along the exhaust aperture 2120. In particular, the angle of attack of the segments of the group $2120ai$ is strictly less than that of the segments of the group $20120a2$ and so on until the last group $20120a_5$ of segments. This disposition makes it possible to take into account the variations in the incidence of the gas flow at the exhaust between the different phases in such a way as to further reduce the impact of the presence of the segments in the gas flow.

The angle of attack α corresponds, as illustrated in FIG. 7, to the angle formed by the normal to the leading edge 2120b of a segment 2120a with the normal Z to the external face 210b of the ferrule 210 taken at the level of the leading edge 2120b of each segment 2120a. On FIG. 7 are represented the segments 2120a superimposed at the level of their leading edge 2120b to compare their angles of attack. It can be seen that the angle of attack α1 of the group of segments located opposite the intake aperture 2110 is greater than the angle of attack α5 of the group of segments located on the side of the intake aperture (only two extreme angles have been represented for the sake of clarity).

This monotonic variation of the angle of attack is adapted as a function of the direction of rotation of the closure member 200 in the turbomachine 10 and of the position of the intake aperture 2110. In particular, one can ensure that the segments 2120b that "see" a gas flow with a high incidence, as is the case at the start of an exhaust phase, have a considerable angle of attack α. Conversely, the segments 2120b that will be disposed in a flow with a lower incidence, for example during the scavenging and at the end of the scavenging, can have a smaller angle of attack α.

In a non-illustrated variant, each segment can have a different angle of attack from that of its neighbor. Of course, everything that has been described above for the first exhaust aperture 2120 is applicable in an identical manner to the second exhaust aperture 2121. It should be noted that a similar provision can be made for the segments 2110a and 2111a of the intake apertures 2110 and 2111, but that the impact of the segments turns out to be less since the variations in the intake gas flow are much less considerable than those in the exhaust gas flow.

The combustion system 1 further comprises a fixed intake guide 300 present on the inside of the ferrule 210 of the closure member 200 on the side of the first section 211 of the closure member (FIG. 2A). The intake guide 300 further comprises a central cylinder 301 radially extended by a disc 302, the cylinder 301 and the disk 302 forming a deflector for the intake air coming, for example, from a compressor 11 arranged upstream of the combustion system. The deflector thus formed makes it possible to guide the air arriving on the intake guide in the direction of the intake ports of the of the combustion chambers. The exhaust guide 300 here contains a plurality of apertures 303 present on the disc 302, the function of which is defined hereinafter. According to a variant embodiment of the intake guide, the latter does not comprise any apertures 303, the disc 302 stopping below the bypass apertures 223 and 224 present on the selective closure member 200. The intake guide 300 can be made of a metallic material or of CMC material.

In the example described here, the combustion system 1 further comprises a fixed exhaust manifold 400 which has a ring shape (FIG. 1). The exhaust manifold 400 extends partly inside the ferrule 210 of the selective closure member on the side of and along the second section 212 of said ferrule (FIG. 8D).

Figure 8A:
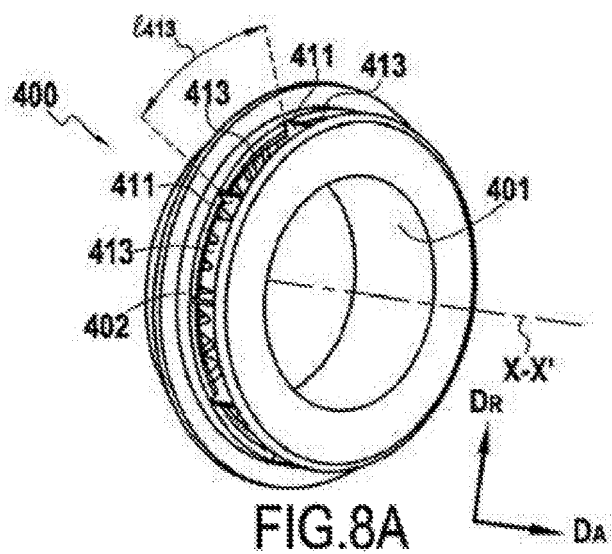
Figure 8B:
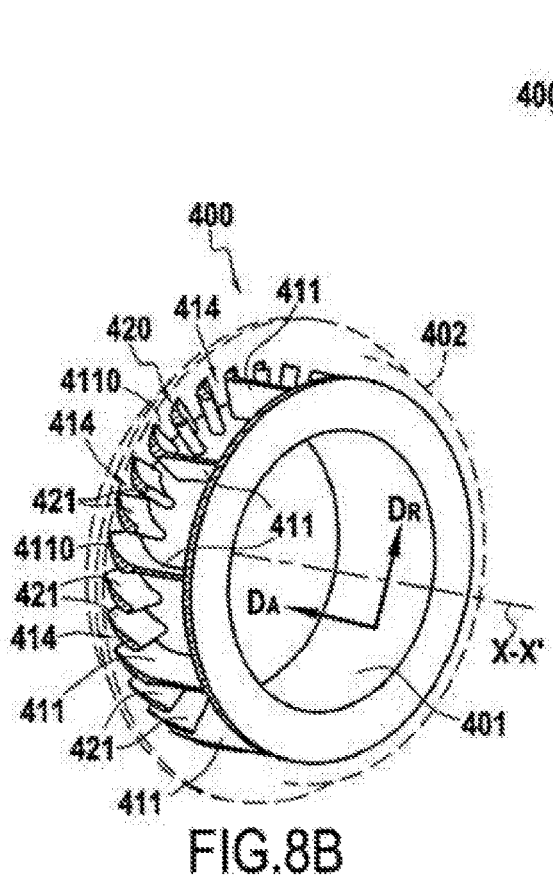
Figure 8C:
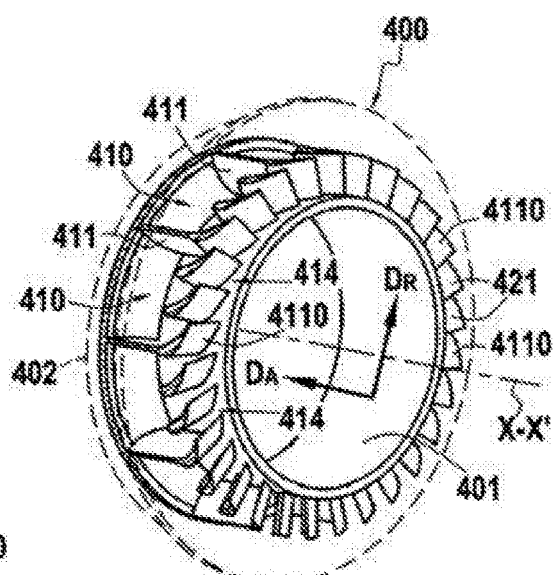
Figure 8D:
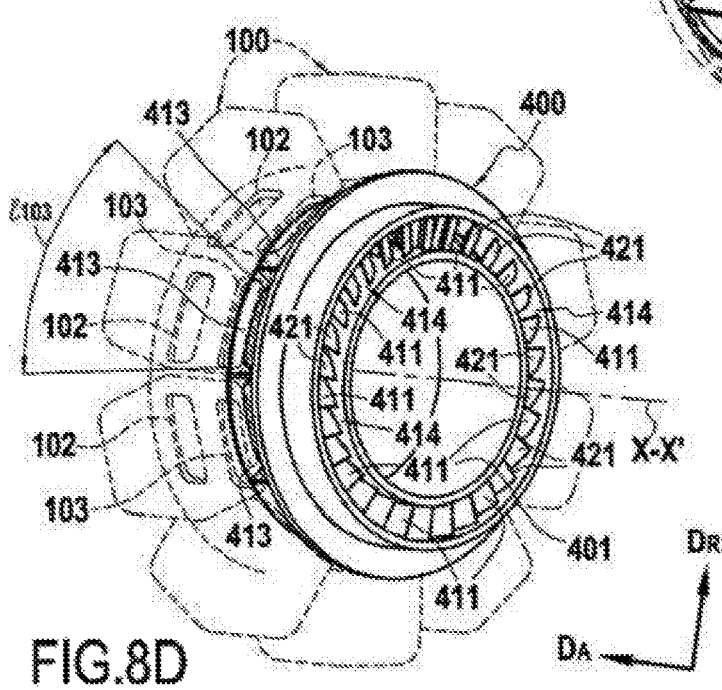

As illustrated in FIGS. 8A to 8D, the exhaust manifold 400 contains an internal ferrule 401 and an external ferrule 402 between which a plurality of partitioned compartments 410 are distributed in an angular manner, each compartment being placed facing an exhaust port 103 of a combustion chamber 100 (FIG. 8D). More precisely, each partitioned compartment 410 is delimited by two radial walls or partitions 411 which extend in the radial direction DR between the internal 401 and external 402 ferrules, the sections of the internal 401 and external 402 ferrules present between two partitions 411 forming respectively the internal and external partitions of the compartments 410. The external ferrule 402 contains a plurality of apertures 413 each corresponding to a first aperture of each partitioned compartment 410. Each first aperture 413 is present facing an exhaust port 103 of a combustion chamber 100, the length 1413 of the first aperture 413 (FIG. 8A) being greater than or equal to the length 1103 of the exhaust port 103 (FIG. 8D). In the example described here, since the combustion system comprises 10 combustion chambers, the exhaust manifold 400 comprises 10 compartments 410. The partitions 411 further mutually define a second aperture 414, downstream of the first aperture 413 and of the exhaust port 103. The terms "upstream" and "downstream" are used here with reference to the direction of flow of the gas flow in the combustion system (arrow F in FIG. 1). The second aperture 414 defines the direction of exhaust of the burnt gases ejected from each exhaust port 103 when a combustion chamber 100 is in the exhaust phase. More precisely, the burnt gases evacuated by the second aperture 414 of a compartment 410 of the exhaust manifold 400 open out downstream of the combustion system in a direction substantially parallel to the axis XX' and in a volume fraction independent of the other volume fractions into which the apertures 414 of the other casings 410 open. When a turbine is present downstream of the constant-volume combustion system 1, such as for example the turbine 12 illustrated in FIG. 1, the latter systematically receives the burnt gases coming from the combustion chambers 100, the compartments 410 preventing the return of the flow of the gases into the chambers in the scavenging phase.

In the example described here, the partitions 411 extend virtually over the entire width of the external surface of the internal ferrule 401 and of the internal surface of the external ferrule 402 in the axial direction DA.

Furthermore, in the example described here but without being limiting, the extremity 4110 of each partition has an aerodynamic profile that is curved with respect to the axial direction XX', which makes it possible to deflect the burnt gases coming from the combustion chambers 100 in a direction not parallel to the axis XX'. The angle of deflection of the direction of the burnt gases is defined by the curvature of the extremities 4110 of the partitions 411. It can notably be determined in order to optimize the efficiency of the combustion system vis-à-vis the turbine placed downstream of thereof. In the combustion system of the invention, the partitions 411 can also have a rectilinear profile between their two extremities.

Still in the example described here and without being limiting, the exhaust manifold 400 further comprises a plurality of fixed vanes 420 present downstream of the compartments 410, one or more vanes (here two) being uniformly distributed between the partitions 411. The fixed vanes 420 each have an aerodynamic profile 421 that is curved with respect to the axial direction XX', the profile 421 of the vanes 420 preferably having a curvature (direction and angle of curvature) similar to that of the extremities 4110 of the partitions 411.

The fixed vanes 420 with the partitions 411 act as nozzle guide vane for the gases coming from the combustion system. The exhaust manifold can be made of metallic material or CMC material.

According to an advantageous disposition of the invention, the selective closure member 200 further comprises a wall 220 extending in the radial direction DR (i.e. perpendicularly to the axis XX') from the internal face 210a of the ferrule, the wall 220 separating the first and second annular sections 211 and 212 of the ferrule 210 (FIGS. 3A and 3B). The wall 220 has a circular central aperture 221, the edge of which is delimited by a cylinder 222. The cylinder 222 is mounted on the upstream side on a first roller bearing 230 forming a single part with the cylinder 220, the first bearing 230 is equipped with a toothed wheel 231 in contact with a pinion 232 mounted on a drive shaft 233 (FIG. 2A). The cylinder 222 comprises on the downstream side a second roller bearing 240. The setting of the closure member to rotate is here controlled by the drive shaft 233 which is linked to an engine external to the combustion system (not represented in FIG. 2A), the shaft 233 crossing the intake guide 300.

According to an advantageous disposition of the invention, the selective closure member comprises one or more bypass apertures. More precisely, in the embodiment described here, the wall 220 of the closure member 200 comprises first and second bypass apertures 223 and 224 which are disposed in a diametrically opposed manner on the wall 220 (FIGS. 3A and 3B). Each bypass aperture extends over an angular area located outside the angular areas over which extend the intake and exhaust aperture or apertures. In the example described here the first and second bypass apertures 223 and 224 respectively extend over angular areas located between the angular areas over which extend the first intake and exhaust apertures 2110 and 2120, on the one hand, and the second intake and exhaust apertures 2111 and 2121 on the other hand. In order to reinforce the wall 220 and the selective closure member 200, each bypass aperture 223 and 224 can be respectively segmented by a plurality of segments 223a and 224a (FIGS. 3A and 3B). The segments 223a and 224a extend in a radial direction DR with respect to the axis XX' and angularly segment the bypass apertures 223a and 223b. In the illustrated example, the segments 223a and 224a are angularly distributed in a uniform manner in the corresponding bypass aperture 223 and 224.

The combustion chambers 100, the selective closure member 200, the intake guide 300 and the exhaust manifold 400 are mounted inside a casing 500 formed of two parts 501 and 502.

The selective closure member 200 is the only rotationally movable member in the combustion system 1. Upon its rotation, the closure member 200 will selectively open and close the intake 102 and exhaust 103 ports of each combustion chamber in order to implement a constant-volume combustion according to the Humphrey cycle, that is to say containing a combustion time, an exhaust time, and a time of intake of fresh air and scavenging of the burnt gases. More precisely, as illustrated in FIGS. 5 and 6, as a function of the angle of rotation of the selective closure member and, as a consequence, of the position of the intake and exhaust apertures present on the ferrule of the closure member 200, certain combustion chambers 100 are in the scavenging phase, others in the exhaust phase and others again in the combustion phase. The FIG. 6 illustrates the phases of the chambers $100_1$ to $100_5$ when the start of the first intake 2111 and exhaust 2121 apertures present on the ferrule 210 of the closure member 200 is aligned with the start of the intake and exhaust ports 102, 103 of the chamber $100_1$. The aperture 2111 here extends over a length $l_{2110}$ covering both an intake port of a first chamber, there the chamber $100_1$, and an intake port of a second chamber, here the chamber $100_2$, adjacent to the first chamber. The exhaust aperture 2121 extends over a length $l_{2121}$ covering 3 consecutive combustion chambers, here the chambers $100_1$, $100_2$ and $100_3$. The start of the intake 2111 and exhaust 2121 apertures are aligned on the ferrule 210 in the axial direction DA.

Figure 11:
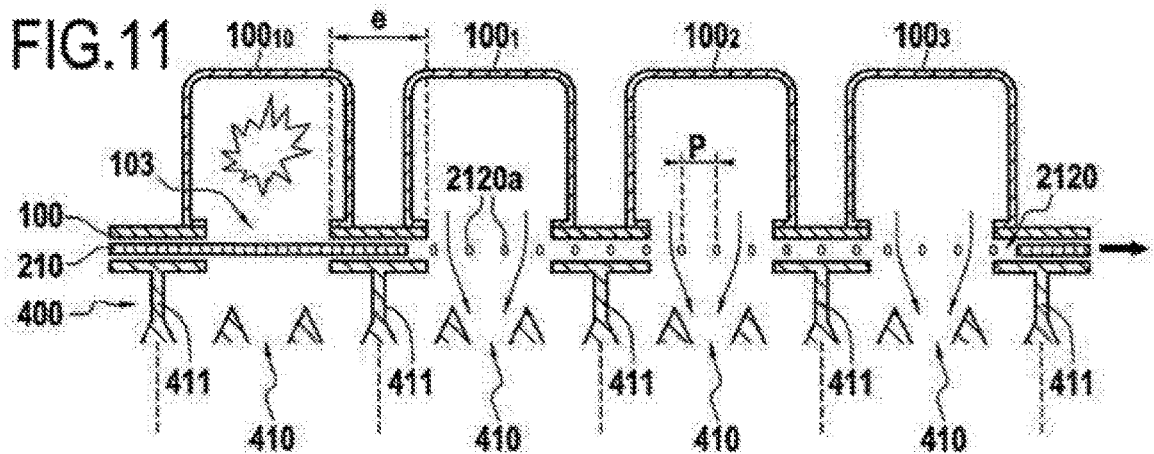
FIG. 11 is a developed sectional schematic view at the level of the exhaust of four combustion chambers in the position of the combustion system illustrated in FIG. 9.
Figure 10:
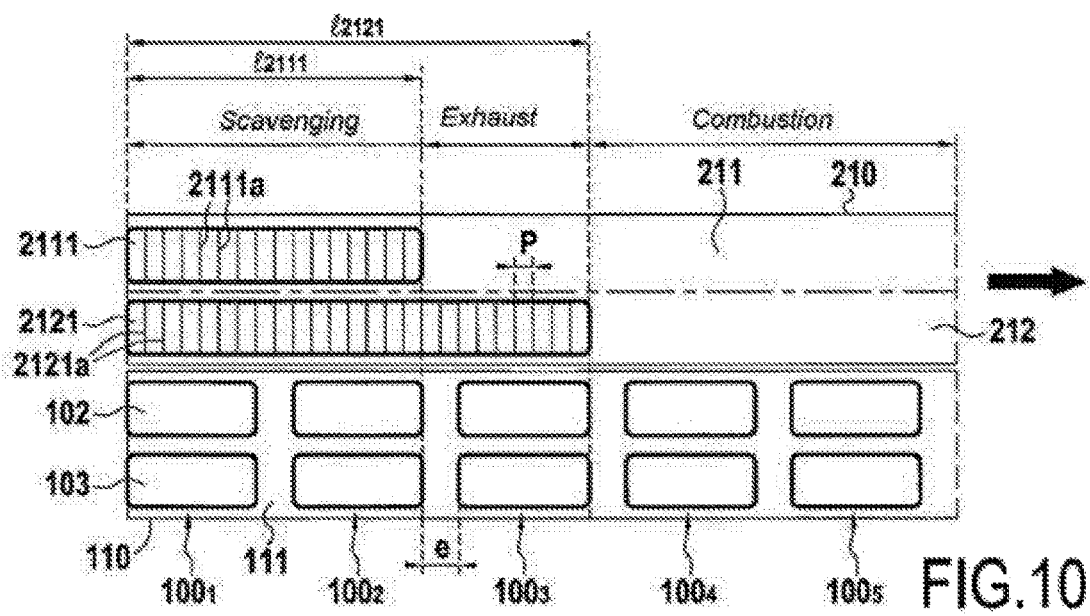
FIG. 10 is a developed schematic view showing the relative positions between the intake and exhaust ports of several combustion chambers, an intake aperture and an exhaust aperture of the selective closure member in the position of the combustion system illustrated in FIG. 9.

In the angular or rotation position of the ferrule 210 illustrated on the FIGS. 10 and 11, the combustion chambers $100_1$ and $100_2$ are in the scavenging phase since the intake 2111 and exhaust 2121 apertures totally open the intake 102 and exhaust 103 ports of the chambers $100_1$ and $100_2$. The chamber $100_3$ is in an exhaust phase, its intake port 102 being totally closed by the ferrule 210 whereas its exhaust port 103 is totally opened by the exhaust aperture 2121. Finally, the combustion chambers $100_4$ and $100_5$ are both in a combustion phase, their intake and exhaust ports being totally closed by the ferrule 210.

Figure 9:
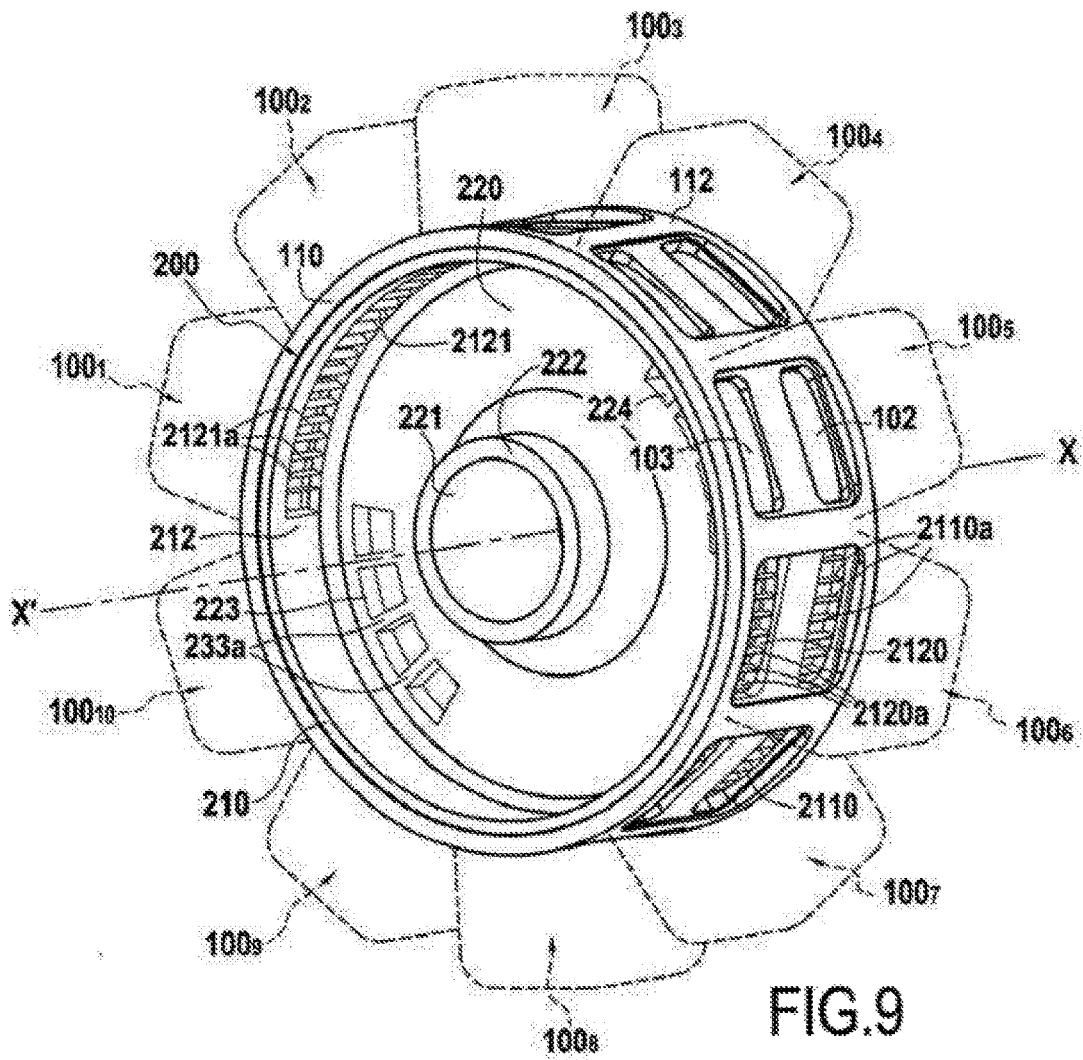
FIG. 9 is a perspective schematic view of the combustion chambers and the selective closure member of the combustion system of FIG. 1.

According to an advantageous disposition of the invention illustrated particularly in FIGS. 10 and 11, the exhaust apertures 103 are mutually separated by a non-zero distance e and the segments 2121a of the second exhaust aperture 2121 are mutually separated by a distance P less than or equal to the distance e, for example less than or equal to 0.5e. In the illustrated example, P=0.5e. FIG. 11 shows a developed sectional schematic diagram (in a plane perpendicular to the direction DA) of the combustion system 1 at the level of the exhaust ports 103 of combustion chambers $100_{10}$, $100_1$, $100_2$, $100_3$. This figure makes it possible to better understand the advantages of such a disposition. It is possible to see the exhaust manifold 400 partitioned by radial partitions 411, as well as the exhaust ports 103 which face the compartments 410 of the manifold 400. As in FIGS. 9 and 10, the chamber $100_{10}$ is at the start of the combustion phase, the chambers $100_1$ and $100_2$ are in the scavenging phase, and the chamber $100_3$ is in the exhaust phase. The closure member 200 has a non-zero thickness through which gases could pass from one chamber to the other. As the exhaust aperture 2121 is segmented by the segments 2121a, the risk that the gases coming from the chamber $100_3$ will be deflected toward the chamber $100_2$ because of the overpressure is further reduced.

FIG. 12 is a table showing the different phases of the Humphrey cycle of each combustion chamber $100_1$ to $100_{10}$ as a function of the angular or rotation position θ of the closure member 200.

The invention claimed is:

1. A constant-volume combustion system for a turbomachine comprising:
    a plurality of combustion chambers distributed in an annular manner about an axis defining an axial direction, each combustion chamber comprising an intake port and an exhaust port,
    a selective closure member rotationally movable about the axis with respect to the combustion chambers, the selective closure member comprising a ferrule facing the intake and exhaust ports of the combustion chambers, the ferrule containing on a first annular section at least one intake aperture intended to cooperate with the intake port of each combustion chamber during the rotation of the selective closure member and on a second annular section at least one exhaust aperture intended to cooperate with the exhaust port of each combustion chamber during the rotation of the selective closure member, each intake aperture and each exhaust aperture extending over a determined length in a circumferential direction with respect to the axis,
    wherein each intake aperture and each exhaust aperture are segmented by at least one segment extending in each aperture in the axial direction (DA), and wherein each segment does not extend beyond a wall of the ferrule of the selective closure member, and
    wherein the selective closure member further comprises a wall extending from the internal face of the ferrule in a radial direction and separating the first and second annular sections of the ferrule, said wall containing at least one bypass aperture extending over an angular area located outside the annular areas over which extend said at least one intake aperture and said at least one exhaust aperture, said at least one bypass aperture being angularly segmented by at least one segment extending in a radial direction with respect to the axis.

2. The system as claimed in claim 1, wherein each segment of each exhaust aperture has, in a plane perpendicular to the axis, an aerodynamic profile extending between a leading edge and a trailing edge, the leading edge being radially directed outward with respect to the trailing edge.

3. The system as claimed in claim 2, wherein each exhaust aperture is uniformly segmented by a plurality of different groups of segments wherein each segment of one and the same group has an identical angle of attack, the angle of attack of the segments of one and the same group of segments varying in a strictly monotonic manner from one group of segments to the other along the exhaust aperture.

4. The system as claimed in claim 2, wherein each exhaust aperture is uniformly segmented by a plurality of segments each having a different angle of attack, the angle of attack of each segment varying in a strictly monotonic manner from one segment to the other along the exhaust aperture.

5. The system as claimed in claim 1, wherein each segment of the intake aperture has, in a plane perpendicular to the axis, an aerodynamic profile extending between a leading edge and a trailing edge, the leading edge being radially directed inward with respect to the trailing edge.

6. The system as claimed in claim 1, further comprising a fixed intake guide present on the inside of the ferrule of the selective closure member on the side of the first section of said closure member, the intake guide containing a central cylinder radially extended by a disc, the cylinder and the disc forming a deflector configured to guide the air arriving on the intake guide in the direction of the intake ports of the combustion chambers.

7. The system as claimed in claim 6, wherein the fixed intake guide further contains a plurality of apertures capable of cooperating with each bypass aperture of the wall of the selective closure member.

8. The system as claimed in claim 1, wherein each combustion chamber is delimited by an enclosure, a closed rear bottom forming a single part with the enclosure and a cylindrical ring to the external face of which the enclosure is attached, the cylindrical ring forming a front bottom of each combustion chamber, the cylindrical ring containing a first series of apertures each forming an intake port of a combustion chamber and a second series of apertures each forming an exhaust port of a combustion chamber,
    the system further comprising a fixed exhaust manifold which extends in an annular manner inside the ferrule of the selective closure member along the second section of said ferrule, the exhaust manifold containing a plurality of partitioned compartments each present at the level of an exhaust port of a combustion chamber.

9. The system as claimed in claim 8, wherein each aperture of the second series of apertures is circumferentially separated from its neighbor by a non-zero distance, the exhaust aperture comprising a plurality of segments uniformly distributed in said aperture and mutually separated by a distance (P) less than or equal to the distance separating two apertures of the second series of apertures.

10. The system as claimed in claim 1, comprising ten combustion chambers distributed in an annular manner around the axis, the ferrule of the selective closure member containing two diametrically opposed intake apertures on the first annular section and two diametrically opposed exhaust apertures on the second annular section of said ferrule, the wall of the selective closure member containing two bypass apertures extending over an angular area located outside the angular areas over which extend the two intake apertures and the two exhaust apertures.

11. The system as claimed in claim 1, wherein the selective closure member is made from one of the following materials: metallic material, ceramic-matrix composite material and eutectic ceramic material.

12. A turbomachine comprising an axial or centrifugal compressor and an axial or centripetal turbine, the turbomachine further comprising a combustion system as claimed in claim 1, the combustion system being present between the compressor and the turbine.

13. An aircraft comprising at least one turbo-propeller engine, the turbo-propeller engine comprising a turbomachine as claimed in claim 12.

* * * * *